United States Patent [19]

Fortier

[11] 4,372,614

[45] Feb. 8, 1983

[54] ROTATING WEDGE FOR BLOCKING UP THE DUMPING PLATFORM OF A TRUCK IN DUMPING POSITION

[76] Inventor: Jacques Fortier, Huberdeau, Comté d'Argenteuil, Quebec, Canada, J0T 1G0

[21] Appl. No.: 263,187

[22] Filed: May 12, 1981

[51] Int. Cl.³ .................................................. B60P 1/04
[52] U.S. Cl. .................................... 298/17 B; 298/22 B
[58] Field of Search ...................... 298/17 B, 17 S, 38, 298/22 B, 12, 13, 14, 15, 16; 188/32, 36, 37; 105/268, 269

[56] References Cited

U.S. PATENT DOCUMENTS

| | | | |
|---|---|---|---|
| 1,715,491 | 6/1929 | Barrett | 298/22 B |
| 2,082,139 | 6/1937 | Bassetti | 298/17 B |
| 2,274,074 | 2/1942 | Lavalier | 298/17 B |
| 2,362,668 | 11/1944 | Schultz | 298/17 B |
| 2,427,381 | 9/1947 | Borgogno | 298/17 B |
| 3,157,435 | 11/1964 | Sherven | 298/17 B |

FOREIGN PATENT DOCUMENTS 365494 1/1932 United Kingdom .............. 298/22 B

*Primary Examiner*—Robert J. Spar
*Assistant Examiner*—Joseph Muncy
*Attorney, Agent, or Firm*—Robic, Robic & Associates

[57] ABSTRACT

A pivoted wedge for blocking up the dumping platform of a truck in dumping position. The wedge comprises a main body in which are rotatably mounted a pair of driven rollers designed for riding on the frame of the truck and allowing translation of the body along the frame, and a driving roller designed for riding on the frame of the dumping platform. The driving roller which forms part of the wedge, positively engages the driven rollers and rotates them in the opposite direction towards the junction between the frame of the truck and the frame of the platform when the dumping platform is moving down, thus causing movement of the wedge towards said junction and self-blocking of the platform in dumping position. This wedge which automatically blocks up to the platform of a truck in dumping position in the case of failure of the hydraulic mechanism used for rising up the platform, can advantageously be used as safety device by a mechanic who has to work under the platform of a dumping truck.

8 Claims, 3 Drawing Figures

ROTATING WEDGE FOR BLOCKING UP THE DUMPING PLATFORM OF A TRUCK IN DUMPING POSITION

The present invention relates to a pivoted wedge that can be used as a safety device for blocking up the dumping platform of a truck in dumping position.

More particularly, the present invention relates to a pivoted wedge that automatically blocks up the platform of the dumping truck in dumping position in the case of failure of the hydraulic mechanism used for rising up the platform and thus advantageously allows a mechanic to work under the platform of the dumping truck without risk of being crushed.

It is well known that numerous accidents have been caused in garages by accidental fall of a dumping platform over the frame of a dumping truck because of failure of the hydraulic mechanism used for rising up the platform, while a mechanic was working under the platform.

A few devices have already been proposed for blocking up the platform of a truck in dumping position and thus avoiding or at least reducing such accidents. For example, U.S. Pat. No. 2,427,381 issued on Sept. 16, 1947 discloses a chock for dumped vehicle comprising a right-angle clamp that can be fixedly bolted onto the frame of the truck to avoid that the chock slides along the frame. This clamp is provided with a leg to which is pivotably secured a head that engages and supports the platform. It is obvious that tools and labour are necessary for mounting such a chock onto the frame of a dumping truck in a safety manner. It is also obvious that such a chock is subjected to shearing forces that make it dangerous, such forces being generated by the weight of the platform when the same bears against the pivot of the head secured to the clamp fixed onto the frame of the truck.

Similarly, U.S. Pat. No. 2,082,139 issued on June 1st, 1937 dislcoses a safety bracket for dumping vehicles, having substantially the same drawbacks as the chock disclosed in U.S. Pat. No. 2,427,381. Indeed, the safety bracket disclosed in this patent comprises a metallic base provided with a post on the upper end of which is rigidly mounted a head. This head includes a rockable, notched plate that is engageable beneath the longitudinal beam of the dumping platform. The bracket therefore must be mounted between the platform and the frame of the truck only at very specific points of said platform when one of the cross beams of the platform intersects the frame of said platform. Indeed, it is compulsory that one of the cross beam of the platform be engaged in the recess or notch provided in the head of the bracket to prevent longitudinal movement thereof. As a result, the safety bracket dislcosed in U.S. Pat. No. 2,082,139 must be located and mounted in a very careful manner between the platform and the frame of the truck.

In both cases, the chock or bracket disclosed in the above patents does not ensure self-blocking of the dumping platform when the same is moving downwards. In both cases too, the disclosed chock or bracket are subjected to shearing forces that make them hazardous in use.

A first object of the present invention is to provide a safety wedge that overcomes the above mentioned drawbacks.

Another object of the present invention is to provide a pivoted wedge for use as safety device by a mechanic who has to work under a dumped vehicle, which wedge provides self blocking up of the platform in dumping position in the case of failure of the hydraulic mechanism used for rising up the platform.

In accordance with the invention, these objects are achieved with a pivoted wedge comprising a main body in which are rotatably mounted a pair of driven means designed for riding on the frame of the truck and allowing translation of the body along said frame, and a driving means designed for riding on the frame of the dumping platform. The driving means positively engages both driven means and rotate them in the opposite direction toward the junction between the frame of the truck and the frame of the platform when the dumping platform is moving down, thus causing movement of the wedge toward the junction and thus self-block of the platform in dumping position.

In accordance with a preferred embodiment of the invention, the driven means comprise first and second cylinders spaced apart from each other. These cylinders are both mounted about first and second shafts extending parallel to each other in a same horizontal plane inside the body. On the other hand, the driving means comprises a third cylinder pivotably mounted about a third shaft extending parallel to the first and second shafts inside the body. This third cylinder has an axis substantially coaxial with the axis of its shaft and is in contact with the first and second cylinders. A supporting element is tangentially fixed to the third cylinder so as to rotate together with it. This element is designed for supporting the frame of the platform.

Preferably, the inner diameter of the third cylinder is substantially larger than the external diameter of the third shaft so as to create a slack and thus allow the third cylinder to freely rotate about its shaft. The presence of such a slack avoids internal wear of the third cylinder and makes the use of lubrificating material unnecessary.

Advantageously, the supporting element comprises a base member extended by a pair of lateral projections which all together define a U-shaped bracket in which the frame of the platform may engage.

The invention will be better understood with reference to the following non restrictive description of a preferred embodiment thereof, taken in connection with the accompanying drawings in which:

FIG. 1 schematically represents a dumping truck provided with a pivot wedge according to the invention between its frame and its platform in dumping position;

Figure 1:
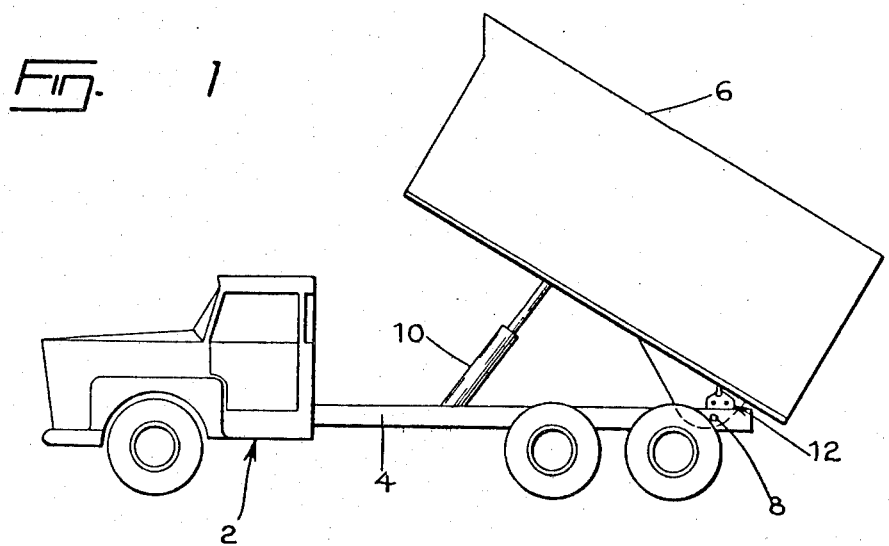

FIG. 1 represents a dumping truck 2 having a very conventional structure with a frame 4 at the rear of which a dumping platform 6 is pivotably mounted about hinges 8. A hydraulic jack 10 is used for rising up the platform 6 in dumping position. In order to block up the platform in dumping position, a wedge 12 is mounted between the frame 4 and the platform 6. As shown in greater details on FIGS. 2 and 3, the wedge 12 comprises a body 14 including two parallel plates 16 and 16' spaced apart from each other.

The wedge 12 also comprises two cylinders 18 and 18' rotatively mounted about a pair of hollow shafts 20 and 20' extending between, and fixed to, the plates 16 and 16'. The shafts 20 and 20' are parallel to each other and extend in a same horizontal plane parallel to the frame 4 of the truck. The cylinders 18 and 18' bear and ride onto a beam 22 of the frame 4. They are both designed for moving the body 14 in translation along the frame. Each of the plates 16 and 16' extends under the level at which the cylinders 18 and 18' bear against the beam and they both define guiding surfaces 24 and 24' in which the beam 22 is engaged.

The third cylinder 26 is rotatively mounted about a third bollow shaft 28 extending between, and fixed to, the plates 16 and 16'. This third cylinder is rigidly connected to a supporting element 30 by means of a spacer 32. The supporting element 30 is designed for receiving a longitudinal reinforcing beam 34 of the frame of the platform 6. For this purpose, the supporting element 30 comprises a base member 36 laterally extended by a pair of projecting members 38 and 38' which together define a U-shaped bracket in which the beam 34 engages. The cylinder 26 is parallel to the cylinders 18 and 18' and in contact therewith. The ends of the shafts 20, 20' and 28 extend through the wedge body 14 outwards the plates 16 and 16' and are rigidly fixed to the same by weldings 40 (see FIG. 3).

It should be noted that the axis of the cylinder 26 is coaxial with the axis of its shaft 28.

It should also be noted that the inner diameter of the cylinder 26 is larger than the external diameter of its shaft 28 so as to create a slack 42 and thus allow this cylinder 26 to freely rotate about its shaft 28. This arrangement is particularly interesting because the presence of such a slack avoids internal wear of the cylinder 26 and makes use of a lubrificating oil unnecessary. It should further be noted that the presence of a shaft 28 for supporting the cylinder 26 is not essential and that, accordingly, the shaft 28 could be removed without preventing or reducing the efficiency of the wedge as, even in this case, the cylinder 26 could still rotate directly against the cylinders 18 and 18' with which the cylinder 26 is in contact. Actually, the advantage of using a shaft 28 is only to make the cylinder 26 and the supporting element 30 connected thereto, an integral part of the wedge and avoid that the cyclinder 30 and element 30 be lost when the wedge is not in use.

Slacks 44 and 44' can also be provided between the inner surfaces of the cylinders 18 and 18' and the peripherical surfaces of their shafts 20 and 20'. As can be easily understood, these slacks do not extend however all around the shafts but only in the lower parts thereof opposed to the points where the cylinders 18 and 18' are in contact with the cylinder 26 that they support together with its supporting element 30, and are pressed against their own shafts by the weight of the cylinder 26 and its supporting element 30.

Figure 2:
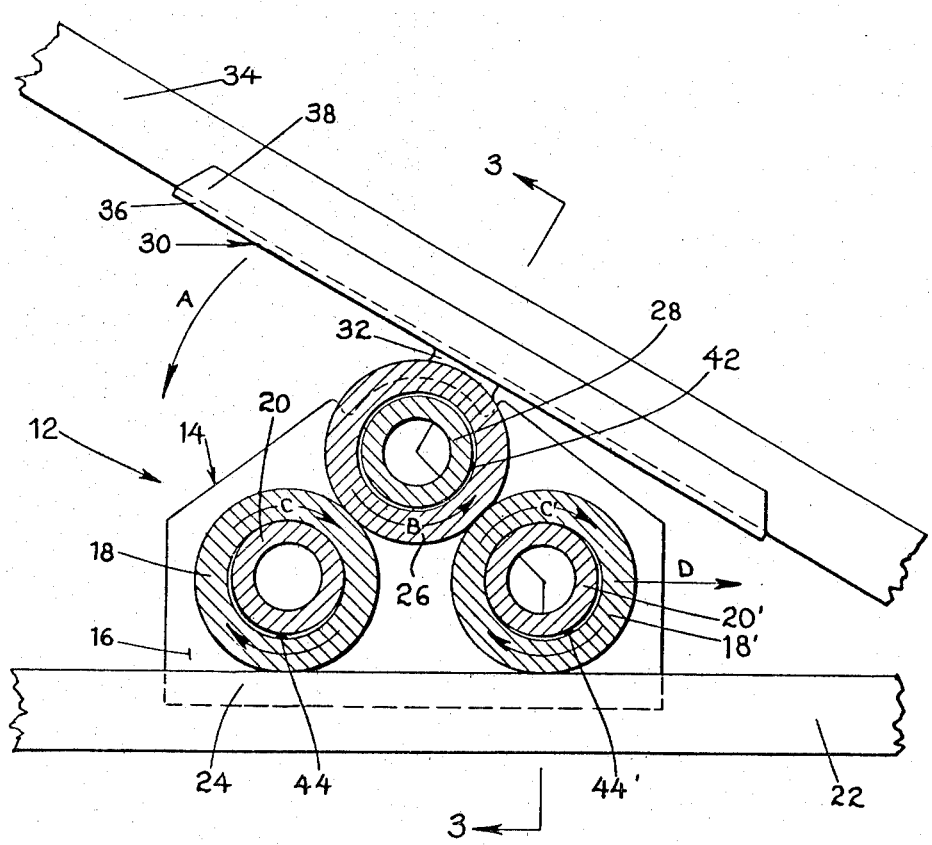
FIG. 2 is a side elevational view of the pivoted wedge in FIG. 1.
Figure 3:
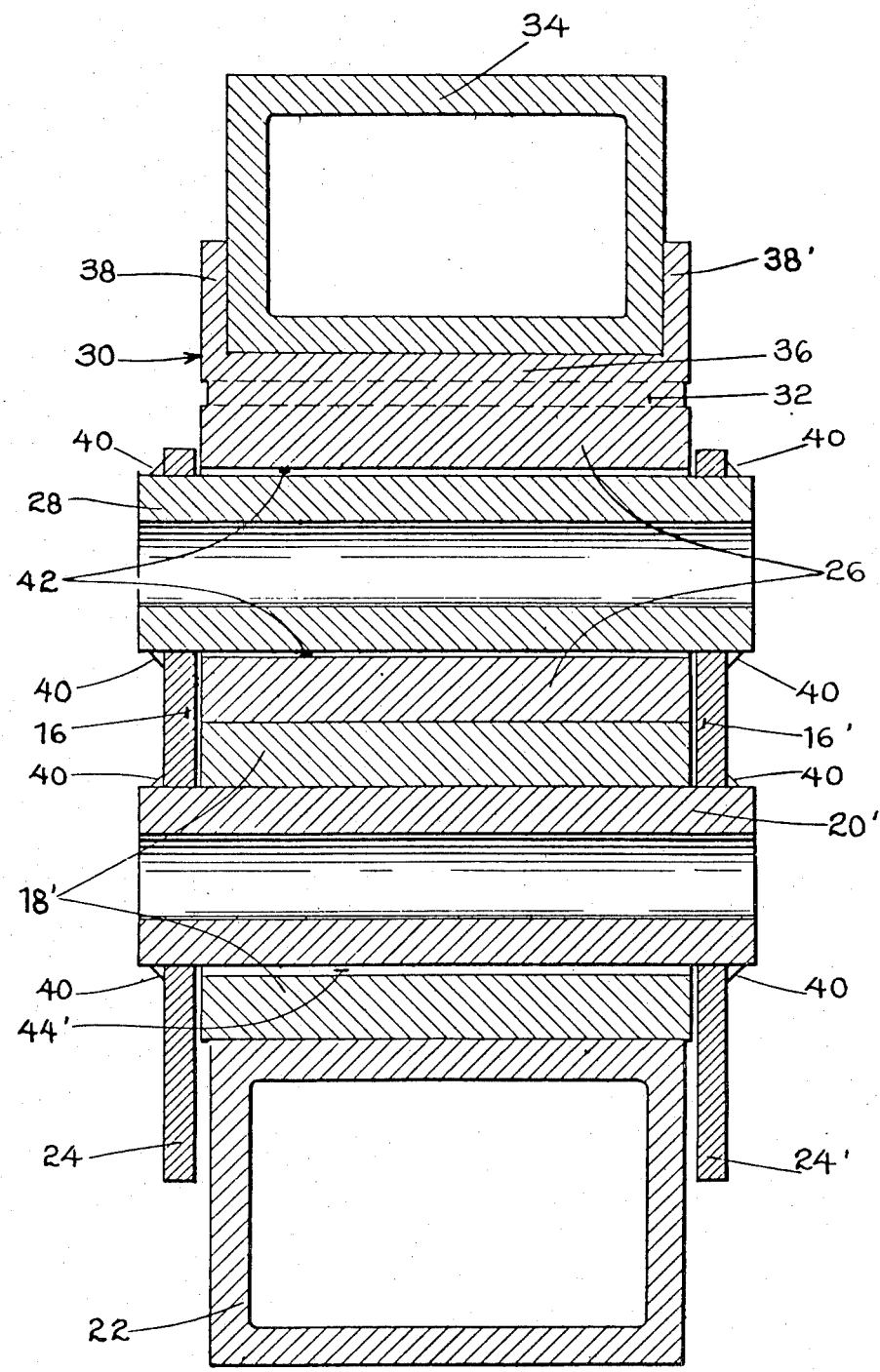
FIG. 3 is a cross-sectional view of the pivoted wedge shown in FIG. 2, according to line 3—3.

The operation of the above described wedge is obvious with reference to FIG. 2 of the drawings. When, in the case of failure of the hydraulic mechanism or circuit of the truck, the platform is moving down from its dumping positions, its beam 34 pivots downwards in the direction indicated by the arrow A and simultaneously rotates the supporting member 30 in which it has been engaged about its cylinder 26 which rotates in the direction indicated by the arrow B. The cylinder 26 in turn rotates the cylinders 18 and 18' in the direction indicated by the arrows C and C' respectively. This rotation of the cylinders 18 and 18' causes the wedge 12 to move in the direction shown by the arrow D towards the rear end of the truck frame and thus to block the platform in dumping position. In other words, the wedge 12 permits to counterbalance the horizontal component of the force which is exerted by the weight of platform and has the propensity of moving the wedge out of its position, by an equivalent force directed in the opposite direction (see arrow D) towards the rear end of the frame of the truck.

I claim:

1. A pivoted wedge for blocking up the dumping platform of a dumping truck in dumping position, comprising a main body, a pair of driven rotating means rotatably mounted in the main body for riding on the frame of the truck and allowing translation of the body along said frame, and driving means rotatably mounted in the main body for riding on the frame of the dumping platform, said driving means positively engaging both driven means and rotating them toward the junction between the frame of the truck and the frame of the platform when the dumping platform is moving down, thus causing movement to the wedge toward the junction and self blocking of the platform in dumping position.

2. A pivoted wedge as claimed in claim 1, wherein the body comprises two guiding surfaces for receiving a beam of the frame of the truck, said driven means bearing onto said beam.

3. A pivoted wedge as claimed in claim 2, wherein said guiding surfaces are defined by the lateral sides of the body which extend under the level at which the driving means bear against the beam.

4. A pivoted wedge as claimed in claim 1, wherein said driven means comprises first and second cylinders spaced apart from each other, said cylinders being respectively mounted about first and second shafts extending parallel to each other in a same horizontal plane inside the body.

5. A pivoted wedge as claimed in claim 4, wherein said driving means comprises a third cylinder pivotably mounted about a third shaft extending parallel to the first and second shafts inside the body, said third cylinder having an axis substantially coaxial with the axis of its shaft and being in contact with said first and second cylinders, and a supporting element tangentially fixed to the third cylinder in such a manner as to rotate together with it, said supporting element being designed for engaging and supporting the frame of the platform.

6. A pivoted wedge as claimed in claim 5, wherein the third cylinder is connected to the supporting element by means of a spacer.

7. A pivoted wedge as claimed in claim 5 or 6, wherein the supporting element comprises a base member extended by a pair of lateral projections which all together define a U-shaped bracket in which the frame of the platform may engage.

8. A pivoted wedge as claimed in claim 5, wherein the inner diameter of the third cylinder is substantially larger than the external diameter of the third shaft so as to create a slack and thus allow the third cylinder to freely rotate about its shaft.

* * * * *